United States Patent [19]

Izumitani et al.

[11] Patent Number: 4,820,662
[45] Date of Patent: Apr. 11, 1989

[54] SILICOPHOSPHATE LASER GLASS

[75] Inventors: Tetsuro Izumitani; Michimasa Matsukawa; Chiemi Hata, all of Tokyo, Japan

[73] Assignee: Hoya Corporation, Tokyo, Japan

[21] Appl. No.: 839,990

[22] Filed: Mar. 17, 1986

[30] Foreign Application Priority Data

Mar. 19, 1985 [JP] Japan .................... 60-53424

[51] Int. Cl.$^4$ ............................. C03C 3/062
[52] U.S. Cl. ........................ 501/73; 501/77; 501/78; 501/79; 252/301.4 P
[58] Field of Search ............ 501/73, 77, 78, 903, 501/79; 252/301.4 P

[56] References Cited

U.S. PATENT DOCUMENTS 4,075,120  2/1978  Myers ................ 252/301.4 P

FOREIGN PATENT DOCUMENTS 3435133  4/1985  Fed. Rep. of Germany ........ 501/73
51-107312  9/1976  Japan .................... 252/301.4 P
60-81041  5/1985  Japan .................... 501/78

Primary Examiner—William R. Dixon, Jr.
Assistant Examiner—Ann M. Knab
Attorney, Agent, or Firm—Cushman, Darby & Cushman

[57] ABSTRACT

A silicophosphate laser glass having a composition comprising, in % by mole,
45 to 70% $P_2O_5$;
5 to 20% $SiO_2$;
60 to 95% $P_2O_5+SiO_2+Al_2O_3$;
10%<$Al_2O_3$≦20%;
20%<($Al_2O_3+SiO_2$)≦30%;
4 to 30% $Li_2O+Na_2O+K_2O$;
0.01 to 12% $Nd_2O_3$;
0 to 5% $La_2O_3+Y_2O_3+B_2O_5$;
0 to 10% R'O; and
0 to 1% $Nb_2O_5+CeO_2$, wherein R' is Mg, Ca, Sr, Ba, Zn or Pb. The silicophosphate laser glass can construct an excellent laser glass as an amplifying medium.

1 Claim, No Drawings

SILICOPHOSPHATE LASER GLASS

FIELD OF THE INVENTION

The present invention relates to a laser glass comprising $P_2O_5$ and $SiO_2$ as glass-forming components.

BACKGROUND OF THE INVENTION

Phosphate laser glass has an advantage that its stimulated emission cross section is large, but encounters disadvantages that, in addition to poor mechanical strength and poor chemical durability, thermal shock resistance is poor due to its large co-efficient of thermal expansion. Such disadvantages of phosphate laser glass can be improved to a certain extent by incorporation $R''_2O_3$ (wherein $R''$ represents Y, La, B or Al) or $R'O$ (wherein $R'$ represents Mg, Ca, Sr, Ba, Zn or Pb; hereafter the same) into the glass composition.

On the other hand, a silicate laser glass generally has excellent mechanical strength and thermal shock resistance, but has a small stimulated emission cross section and a large concentration quenching. As a result, a large amount of $Nd_2O_3$ cannot be doped in the glass.

Investigations were made in a laser glass
(1) to increase a thermal shock resistance;
(2) to decrease a concentration quenching and reduce moisture, thereby increasing a stored energy; and
(3) imparting a relatively small stimulated emission cross section, thereby reducing a parasitic oscillation.

SUMMARY OF THE INVENTION

It has been found that by replacing a part of $P_2O_5$ which is a main component of a phosphate laser glass with $SiO_2$, a coefficient of thermal expansion can be reduced, and accordingly, a thermal shock resistance thereof can be increased.

It has been also found that incorporation of a large amount of $SiO_2$ into a phosphate glass results in deterioration of a chemical durability of the phosphate glass, but this disadvantage can be improved by the addition of $Al_2O_3$, and the stimulated emission cross section can be decreased by replacing a part of $SiO_2$ with $Al_2O_3$.

It has been further found that a glass having a small concentration quenching of fluorescence can be obtained by using $P_2O_5$ as a base glass.

Accordingly, an object of the present invention is to provide a laser glass having a small coefficient of thermal expansion by adding $SiO_2$ to a phosphate glass, a small concentration quenching by using $P_2O_5$ as a base glass and a small stimulated cross section by replacing $SiO_2$ with $Al_2O_3$.

DETAILED DESCRIPTION OF THE INVENTION

The basic glass system of the silicophosphate laser glass according to the present invention is $P_2O_5$—$SiO_2$—$Al_2O_3$—$R_2O$—$Nd_2O_3$, wherein R is Li, Na or K.

The silicophosphate laser glass according to the present invention has a composition comprising, in % by mole, 45 to 70% $P_2O_5$;
5 to 20% $SiO_2$;
60 to 95% $P_2O_5+SiO_2+Al_2O_3$;
10%<$Al_2O_3$≦20%;
20%<($Al_2O_3+SiO_2$)≦30%;
4 to 30% $Li_2O+Na_2O+K_2O$:
0.01 to 12% $Nd_2O_3$;
0 to 5% $La_2O_3+Y_2O_3+B_2O_3$;
0 to 10% R'O; and
0 to 1% $Nb_2O_5+CeO_2$, wherein R' is Mg, Ca, Sr, Ba, Zn or Pb.

This glass as a laser glass has the characteristics of a small concentration quenching of fluorescence, an appropriate stimulated emission cross section to an extent such that a parasitic oscillation does not occur and a large thermal shock resistance.

In the glass composition (expressed in % by mole) of the present invention, $P_2O_5$ must be present in an amount of 45 to 70%. If the amount of $P_2O_5$ is outside the above range, the stability of the glass deteriorates or the volatility thereof increases.

The amount of $SiO_2$ is from 5 to 20%. The addition of $SiO_2$ increases the strength of the glass and decrease the coefficient of thermal expansion of the glass. However, if the amount of $SiO_2$ exceeds 20%, the concentration quenching becomes remarkable and also the chemical durability deteriorates.

Further, to reduce the coefficient of thermal expansion while maintaining the stimulated emission cross section at a desired level, the total amount of $P_2O_5+SiO_2+Al_2O_3$ should be maintained in the range of 60 to 95%.

$Al_2O_3$ is added in an amount of 10%<$Al_2O_3$≦20% to reduce the stimulated emission cross section, thereby adjusting the same to the appropriate value depending on the purpose.

If the total amount of $Al_2O_3+SiO_2$ is 20% or less, the strength decreases and the stimulated emission cross section increases.

If the total amount of $Li_2O+Na_2O+K_2O$ is less than 4%, the glassification becomes difficult. On the other hand, if the total amount thereof exceeds 30%, the coefficient of thermal expansion increases, and as a result, the thermal shock resistance decreases and also the chemical durability deteriorates.

$Nd^{3+}$ is the active ion of the laser glass and $Nd_2O_3$ must be present in an amount of at least 0.01% in order to exhibit the characteristics as a laser glass. In the glass composition of the present invention, $Nd_2O_3$ can be added up to 12% (30×$10^{20}$ ions/cc as $Nd^{3+}$).

Regarding optional components, $La_2O_3+Y_2O_3+B_2O_3$ can be used by replacing for $Al_2O_3$ in the range of 0 to 5%.

R'O (R'=Mg, Ca, Sr, Ba, Zn or Pb) can be used by replacing for $Li_2O$, $Na_2O$ and $K_2O$ in the range of 0 to 10% and is effective to reduce the coefficient of thermal expansion and improve the chemical durability.

In addition, $Nb_2O_5+CeO_2$ are components effective to prevent solarization in the range of 0 to 1%.

The silicophosphate laser glass of the present invention is prepared by mixing glass raw materials so as to obtain the glass composition described above, melting the mixture, sufficiently removing water by means of, for example, bubbling with dry gas, in a conventional manner and then molding into a desired shape.

The present invention will be now described with the properties of the laser glass in accordance with the present invention in more detail by reference to the following examples.

EXAMPLE 1

TABLE 1

| Component | Glass Composition (mol %) Run No. | | | | | | | |
|---|---|---|---|---|---|---|---|---|
| | 1 | 2 | 3 | 4 | 5 | 6 | 7 | 8 |
| $P_2O_5$ | 60 | 60 | 60 | 60 | 59.8 | 59.8 | 59.8 | 59.8 |
| $SiO_2$ | 12 | 10 | 8 | 5 | 10 | 10 | 10 | 10 |
| $Al_2O_3$ | 13 | 15 | 17 | 20 | 10.2 | 10.2 | 10.2 | 10.2 |
| $Li_2O$ | 13 | 13 | 13 | 13 | 18 | — | 10 | 10 |
| $K_2O$ | — | — | — | — | — | 18 | — | — |
| $Nd_2O_3$ | 2 | 2 | 2 | 2 | 2 | 2 | 2 | 2 |
| MgO | — | — | — | — | — | — | 8 | — |
| BaO | — | — | — | — | — | — | — | 8 |
| $Nd^{3+}$ ($10^{20}$ ion/cc) | 5.45 | 5.39 | 5.36 | 5.28 | 5.54 | 5.03 | 5.55 | 5.46 |
| $\sigma_p$ ($10^{-20}$ cm$^2$) | 3.6 | 3.5 | 3.4 | 3.2 | 3.7 | 4.0 | 3.6 | 3.7 |
| $\alpha$ ($10^{-7}$/°C.) | 81 | 78 | 75 | 75 | 93 | 114 | 84 | 89 |

$\sigma_p$: Stimulated emission cross section
$\alpha$: Coefficient of thermal expansion

EXAMPLE 2

Five kinds of silicophosphate laser glasses were prepared in accordance with the composition of Run No. 5 of Example 1 except that the concentration of $Nd^{+3}$ ions was changed. Fluorescent life time of each glass was measured. The results obtained are shown in Table 2 below.

Fluorescent life time is affected by the amount of water (OH group) contained in the glass. Therefore, the infrared absorption coefficient due to the O—H vibration in the vicinity of about 3.3μ is also indicated in Table 2 as a measure of the amount of OH.

TABLE 2

| Change in Fluorescent Life Time | | | | | |
|---|---|---|---|---|---|
| $Nd^{3+}$ ($10^{20}$ ions/cc) | 1.46 | 2.88 | 5.59 | 8.35 | 11.0 |
| Absorption Coefficient (cm$^{-1}$) | 1.1 | 0.9 | 1.0 | 1.5 | 1.3 |
| Fluorescent Life Time of Silicophosphate Glass (μs) | 380 | 360 | 290 | 230 | 180 |
| Fluorescent Life Time of Silicate Glass (μs) | 390 | 310 | 150 | 90 | 50 |

As is apparent from Table 2, the silicophosphate laser glass of the present invention has a small concentration quenching of fluorescence and enables to doping $Nd_2O_3$ up to high concentration range. Therefore, the stored energy is large, the stimulated emission cross section is appropriate, and the loss due to parasitic oscillation is small. Accordingly, the silicophosphate laser glass of the present invention can be expected to construct an excellent glass laser as an amplifying medium.

While the invention has been described in detail and with reference to specific embodiments thereof, it will be apparent to one skilled in the art that various changes and modifications can be made therein without departing from the spirit and scope thereof.

What is claimed is:

1. A silicophosphate laser glass having a composition consisting, essentially of, in % by mole, 45 to 70% $P_2O_5$;
5 to 20% $SiO_2$;
60 to 95% $P_2O_5+SiO_2+Al_2O_3$;
10% < $Al_2O_3 \leq$ 20%;
20% < ($Al_2O_3+SiO_2$) $\leq$ 30%;
4 to 30% $Li_2O+Na_2O+K_2O$;
0.01 to 12% $Nd_2O_3$;
0 to 5% $La_2O_3+Y_2O_3+B_2O_3$;
0 to 10% R'O; and
0 to 1% $Nb_2O_5+CeO_2$, wherein R' is Mg, Ca, Sr, Ba, Zn or Pb.

* * * * *